United States Patent [19]

Escamilla et al.

[11] Patent Number: 5,095,813
[45] Date of Patent: Mar. 17, 1992

[54] APPARATUS FOR PRESSING AND BAKING DOUGH DISCS

[75] Inventors: Robert Escamilla, San Antonio; Elias Escamilla, III, Helotes; Ralph DeLeon, San Antonio, all of Tex.

[73] Assignee: Bakery Equipment and Service Company, Inc., San Antonio, Tex.

[21] Appl. No.: 703,276

[22] Filed: May 20, 1991

[51] Int. Cl.⁵ .................................. A47J 39/04
[52] U.S. Cl. .................................. 99/349; 99/353; 99/395; 99/423; 100/93 P
[58] Field of Search ............... 99/349, 353, 443 R, 99/443 C, 386, 393, 395, 423, 448, 449, 427, 355; 426/512, 513, 496, 502, 517, 497, 523, 93 P; 100/156, 210, 93 P, 232, 292; 425/397, 406

[56] References Cited

U.S. PATENT DOCUMENTS

| | | | |
|---|---|---|---|
| 3,739,712 | 6/1973 | Duning | 99/443 C |
| 3,880,064 | 4/1975 | Martinez | 99/372 |
| 4,197,792 | 4/1980 | Mendoza | 99/353 |
| 4,241,648 | 12/1980 | Longenecker | 99/349 |
| 4,504,209 | 3/1985 | Skloss | 99/353 |
| 4,508,025 | 4/1985 | Schultz | 99/353 |
| 4,510,165 | 4/1985 | Caridis et al. | 99/427 X |
| 4,567,819 | 2/1986 | Adamson | 99/349 |
| 4,664,025 | 5/1987 | Martinez | 100/93 P |
| 4,724,755 | 2/1988 | Escamilla | 99/349 |
| 4,838,153 | 6/1989 | Escamilla et al. | 99/349 |
| 4,913,040 | 4/1990 | Sherman et al. | 99/349 |

FOREIGN PATENT DOCUMENTS 1420515 1/1976 United Kingdom .............. 99/349

Primary Examiner—Timothy F. Simone
Attorney, Agent, or Firm—Hubbard, Thurman, Tucker & Harris

[57] ABSTRACT

A pair of cooperating heating and pressing plates for converting a ball of dough into a flat baked disc, such as a tortilla, are mounted between vertical side frames of a supporting frame structure. The one heating and pressing unit is fixedly mounted at an angle to the horizontal sufficient to insure the gravitational discharge of the baked tortilla. The movable plate is shifted by a manually operable cam. All elements of the apparatus are secured in position between the side frames by a plurality of manually operable bolts, thus permitting the rapid disassembly of the apparatus for cleaning purposes and the equally rapid reassembly of the apparatus.

11 Claims, 2 Drawing Sheets

APPARATUS FOR PRESSING AND BAKING DOUGH DISCS

BACKGROUND OF THE INVENTION

1. FIELD OF THE INVENTION

The invention relates to an apparatus for manually pressing a ball of dough into a flat disc configuration and then effecting the baking of the disc by the same plates that accomplished the pressing, and more particularly, to an apparatus for producing tortillas.

2. SUMMARY OF PRIOR ART

In prior patents issued to the Assignee of this invention, namely U.S. Pat. Nos. 4,724,755 and 4,769,252, there is disclosed a combination pressing and baking mechanism for converting balls of dough into thin flat baked discs, such as tortillas. The pressing unit comprises a pair of relatively pivotally movable heated pressing plates. The lowermost pressing plate is disposed at a substantial angle to the horizontal when in its remote position relative to the upper pressing plate. The angle of the lower pressing plate is selected to effect the gravitationally induced sliding of the pressed disc of dough off the lower pressing plate and onto a horizontally movable heating plate or disc of an oven. The apparatus disclosed in these two prior patents is designed to permit the continuous production of tortillas at a substantial rate and hence the pressing operation, which requires a minimum of time, is separated from the baking operation which requires a greater time and hence is designed to permit a plurality of discs of dough to be concurrently baked.

There are many restaurants producing tortillas wherein the volume required is substantially in excess of the capability of the pressing and baking machines disclosed in said prior patents. There is a need therefore, for a pressing and baking apparatus for forming baked discs of dough, such as tortillas, which may be manually operated to effect the pressing and the baking of the dough disc by the same apparatus. Such an arrangement will greatly reduce the cost of the tortilla making machine.

SUMMARY OF THE INVENTION

The invention provides a U-shaped frame structure, preferably formed by stamping a stainless steel sheet which has a pair of horizontally spaced, vertical side walls or side frames interconnected by a bottom wall or bottom frame. A pair of combined pressing and heating plates are mounted between said side frames. One of such plates is fixedly mounted between the side frames and the other plate is pivotally mounted so as to be movable between two positions relative to the fixed plate. In the one position, the movable plate is remote from the fixed plate a distance permitting the insertion of a ball of dough between the plates. In the second position, the movable plate is positioned a selected distance from the fixed plate corresponding to the desired thickness of the disc of dough or tortilla to be baked between the plates. Each of the plates is provided with a support box on the surface opposite its dough contacting surface. Each support box contains an electrical heating unit capable of transmitting sufficient heat to the adjacent surface of the respective plate to effect the baking of a tortilla therebetween when the movable plate is disposed in its pressing position.

The fixed plate is disposed at an angle relative to the horizontal which has sufficient inclination to insure that the baked tortilla will gravitationally slide off the upwardly facing one of the fixed and movable plates when the movable plate is moved to its first remote position with respect to the fixed plate. Thus no scraping of the dough engaging surface of the fixed or movable plates will be required to effect the discharge of the baked disc of dough from the apparatus.

The movable plate is manually shifted into its pressing position relative to the fixed plate by a manually pivoted cam. The cam has a tubular central portion which is pivotally mounted on a stationary pivot shaft which extends between the two side frames. A projecting handle extends outwardly from the tubular body portion of the cam to permit the application of substantial force to the cam and hence to the movable plate as it moves into its final pressing position relative to the fixed plate.

A special feature of the invention resides in the mounting of the various elements of the machine between the side frames. The fixed plate is secured between the side frames by manually operable bolts which respectively traverse the side frames and operatively engage the support box for the fixed plate. By manually operable bolt is meant a bolt having a radially enlarged head portion which can be readily grasped by the operator and either tightened or loosened without need for tools. Similarly, the movable plate is pivotally mounted on a shaft which traverses the space between the two side frames and the ends of the shaft have threaded bores which are respectively engaged by two more manually operable bolts traversing the side frames. In similar fashion, the pivot shaft for mounting the manually operable cam is held in position between the two side frames by two more pivot bolts. Lastly, an electrical control box, containing plug type receptacles for effecting electrical connections to the two pressing and heating plates and an off/on switch, is designed so as to be snugly insertable between the two side frames and held in position by two more manually operable bolts.

With the foregoing construction, relying on manually operable bolts for holding all of the operative elements of the pressing and baking machine in position, it is readily apparent that the entire machine may be quickly disassembled to permit thorough cleaning of the pressing and baking plates, cam mechanism, and even the U-shaped frame member. This is a great advantage to the restaurant operator who requires only a small volume of tortillas to be produced. Assembly is accomplished with equal speed.

Further objects and advantages of the invention will be readily apparent from the following detailed description, taken in conjunction with the annexed sheets of drawings, on which is shown a preferred embodiment of the invention.

DESCRIPTION OF PREFERRED EMBODIMENT

Figure 2:
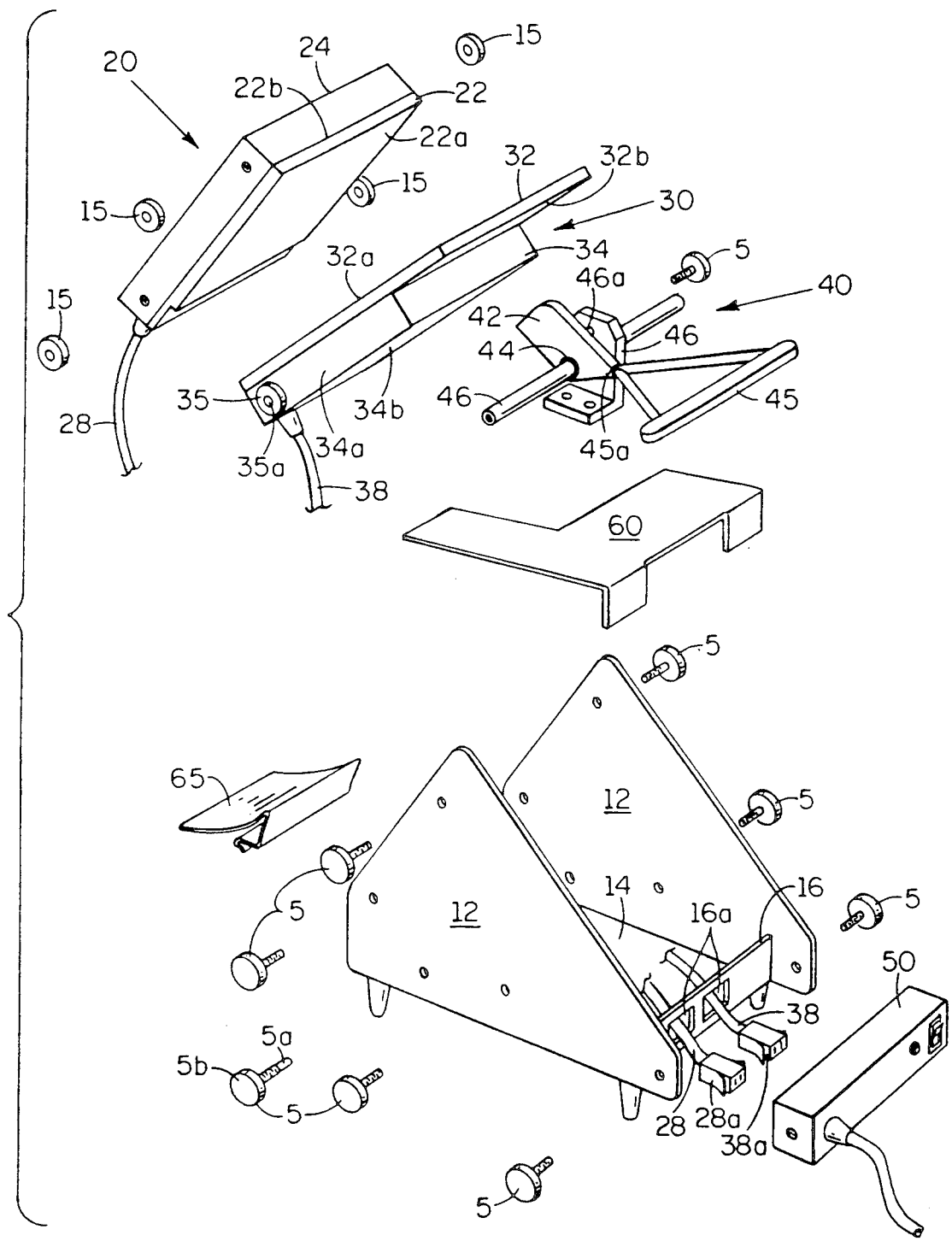
FIG. 2 is an exploded perspective view of the machine of FIG. 1.

Referring to the drawings and particularly FIG. 2, there is shown an apparatus 1 embodying this invention for pressing and baking a disc of dough such as a torti- 11a. Such machine preferably comprises a unitary frame structure 10. Frame structure 10 is integrally formed by stamping operations on a sheet of stainless steel to provide two horizontally spaced, vertical side frames 12 secured by a bottom frame 14. Obviously side frames 12 could be welded or bolted to bottom frame 14. Additionally, an upstanding flange 16 is formed on one edge of the bottom frame for a use that will be later exexplained.

A pair of pressing and heating units 20 and 30 are provided for mounting in cooperative relationship between the side frames 14. The pressing unit 20 comprises a pressing and heating plate 22 having a dough contacting planar surface 22a and an opposed heat receiving surface 22b. A support box 24 is rigidly secured to the heat receiving surface 22b. An electrical heating element 26, shown only by dotted lines in FIG. 2, is conventionally mounted within the support box 24 to impart heat to the heat transfer surface 22b, hence heating the dough engaging surface 22a of the pressing and heating plate 22 to the desired baking temperature.

Figure 1:
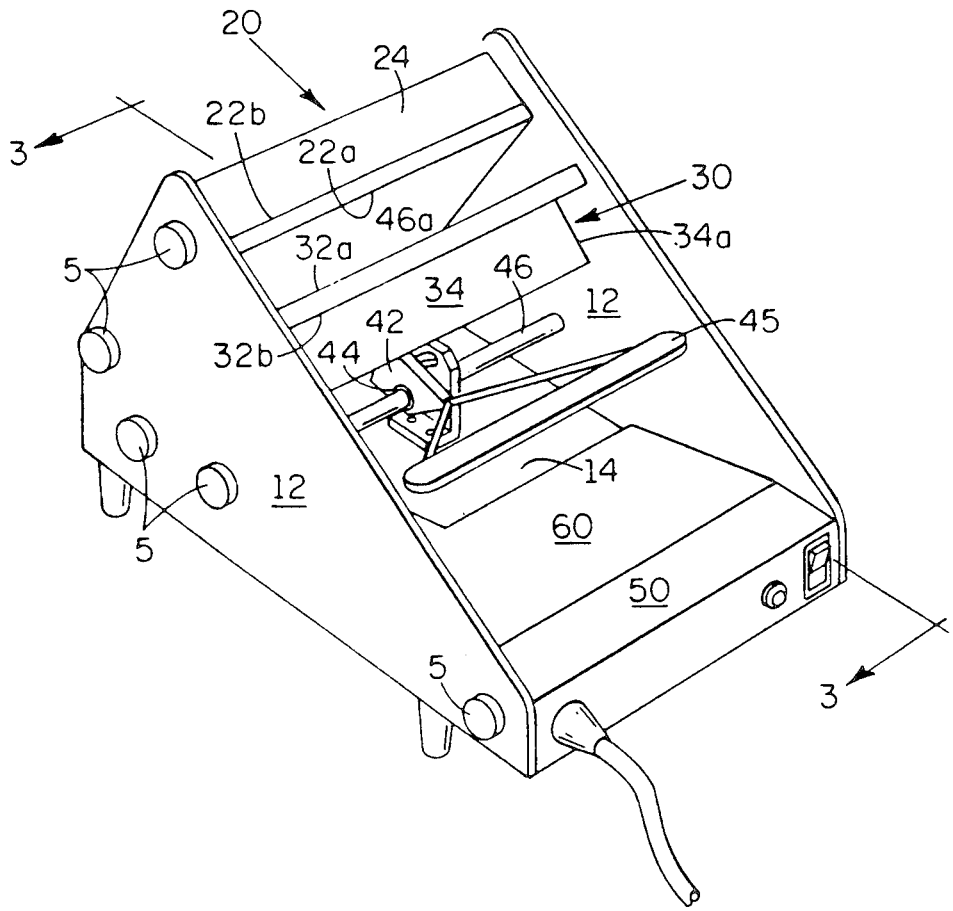
FIG. 1 is a perspective view of an assembled tortilla pressing and baking machine embodying this invention.

The pressing and heating plate unit 20 is mounted in a fixed position between the side frames 12, as indicated in FIG. 1, and is disposed at a substantial angle to the horizontal for reasons to be later discussed. It is secured in this fixed position by two pairs of manually operable bolts 5 with each pair respectively traversing the side frames 12, and washers 15 to threadably engage the adjacent sidewalls of the support box 24. An electrical cord 28 extends out of support box 24 for connection to a suitable energy source, as will be described.

The second pressing and heating unit 30 is of generally similar construction to the aforedescribed unit 20. Thus the pressing and heating unit 30 includes a pressing and heating plate 32 having a dough contacting surface 32a and an opposed heat receiving surface 32b. A support box 34 is rigidly secured to the heat receiving surface 32b and houses an electrical heating element 36 which is shown only in dotted lines in FIG. 3. An electrical cord 38 supplies energy to the electrical heating element 36.

The second pressing and heating unit 30 is pivotally mounted between the vertical side frames 12 so as to be movable between two positions relative to the fixedly mounted first pressing and heating unit 20. In the one position, shown in FIG. 1, the movable pressing and heating unit 30 is located in a remote position relative to the fixed pressing and heating unit 20, so that a ball of dough may be readily inserted between the dough contacting surfaces 22a and 32a. The second position of the movable pressing and heating unit 30 relative to the fixed pressing and heating unit 20 places the dough engaging surfaces in substantially parallel adjacent relationship, with the separation of surfaces 22a and 32a being reduced to the desired thickness of the disc of dough compressed between dough engaging surfaces 22a and 32a.

The pivotal mounting of the second pressing and heating unit 20 is accomplished by a horizontal shaft 35 which is journalled in the opposed side walls 34a of the support box 34. Shaft 35 has threaded bores 35a in each end and a pair of manually operable bolts 5 respectively traverse the side frames 12 and threadably engage bores 35a.

The second heating and pressing unit 30 is therefore pivotally movable into a position substantially parallel to the dough contacting surface 22a of the first heating and pressing unit 20 but spaced therefrom a distance corresponding to the desired thickness of the baked tortilla.

The pivotally mounted second heating and pressing unit 30 is manually shifted from its first remote position to its second operative position by a cam structure 40. Cam structure 40 includes a cam 42 which is abuttable with the underside of the support box 34. The medial portion of the cam 42 is mounted on a bearing 44 which is pivotally mounted on a transverse shaft 46 which is secured in a horizontal position intermediate the side frames 12 by two more manually operable bolts 5. The other end of cam 42 forms the shank portion 45a of a handle 45 for effecting the rotation of cam 42 and hence the relative pivotal movement of the two pressing and heating plates 22 and 32.

The angular movement of the cam 42 is limited by a slot 46a provided in an L-shaped bracket 46 which is secured to the bottom frame 14 in upstanding relationship by suitable screws. Another manually operable bolt 5 traverses the slot 45a and limits the angular movement of the cam 42 to the extent desired.

The electrical cords 28 and 38 extending from the heating units of the pressing and heating plates 22 and 32 are best shown in the exploded view of FIG. 2 and it will be seen that they terminate in plugs 28a and 38a respectively and pass through openings 16a provided in the upstanding flange 16 formed on what is the front end of the bottom frame 14. The upstanding flange 16 provides a back plate against which an electrical control box 50 may be abutted. The length of the control box 50 is selected so that the box 50 is snugly insertable between the two forward ends of the side frames 12 and is secured at that position by still another pair of manually operable bolts 5. The electrical control box 50 includes a power cord 52, two female electric plugs (not shown) for respectively receiving the plugs 28a and 38a, an on/off switch 54 and an indicating light 56. To protect the electrical plugs 28b and 38b from drippage, an L-shaped sheet metal cover plate 60 is provided which covers the electrical cords and plugs and is secured by a depending flange 61 between flange 16 and the control box 50.

Figure 3:
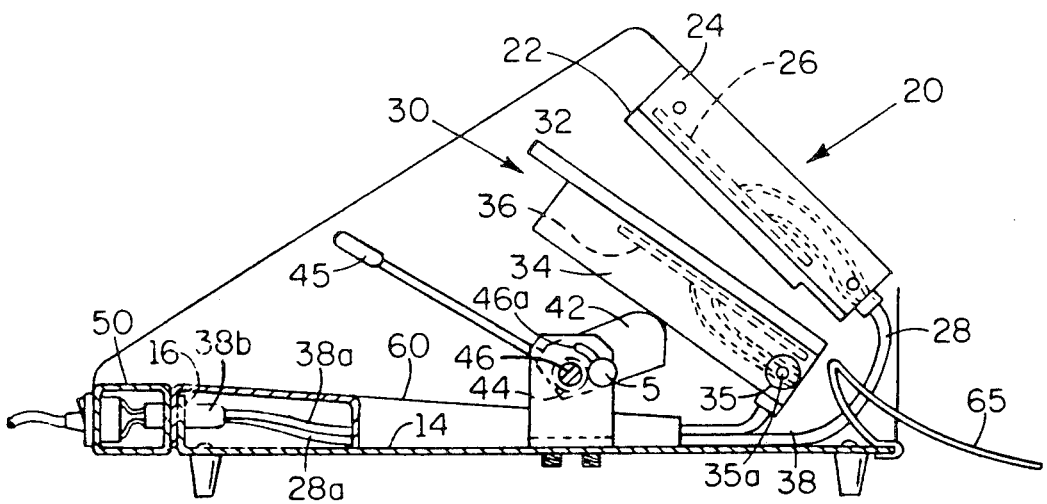
FIG. 3 is a vertical sectional view taken on the plane 3—3 of FIG. 1.

Lastly, a baked tortilla guide 65 formed of stamped sheet metal, preferably stainless steel, is provided which snaps over the rearward edge of the bottom frame 14 as best shown in FIG. 3.

The operation of the aforedescribed apparatus will be readily apparent to those skilled in the art. A ball of dough is manually inserted between the two heating and pressing units 20 and 30 when the movable unit 30 is in its remote position as shown in FIG. 3. The cam 42 is then actuated by the handle 46 to bring the movable heating and pressing plate 32 into a position substantially parallel to but slightly spaced from the dough contacting surface of the fixed plate 22 to conform to the desired thickness of the baked tortilla. The heating and pressing plates 22 and 32 will have already been heated up to baking temperature so that the pressed disc is rapidly baked while the heating and pressing plates 22 and 32 remain in their pressing positions. When the pressing is completed, the movable heating and pressing unit 30 is shifted to its remote position by an operation of the handle 45 and the baked tortilla disc is moved by gravity from the surface of movable pressing and heating plate 32 which has an upwardly facing surface engaging the dough disc. For this reason, the inclination of the fixed heating and pressing unit 20 with respect to the horizontal must be selected to provide a sufficiently great angle to insure the gravitational discharge of the baked tortilla. To facilitate such discharge, the dough contacting surfaces may have an anti-friction coating applied, such as that sold under the trademark "Teflon".

The prominent feature of the aforedescribed apparatus is the employment of the multitude of hand operable bolts 5. As illustrated in FIG. 2, each hand operated bolt 5 comprises a threaded shank portion 5a and radially enlarged head portion 5b which is of sufficient size that the manual application of a torque will be sufficient to rigidly secure the bolts to whatever element they are threadably engaging, or conversely, to permit the manual loosening of the bolts 5. Thus, the entire apparatus may be disassembled into its component parts by manually removing the manually operable bolts 5. This greatly facilitates the cleaning of the device. The reassembly of the machine is equally convenient, requiring only the insertion of the manually operable bolts 5 into the respective threaded bores receiving such bolts.

Modifications of the invention will be readily apparent to those skilled in the art. For example, the fixed heating plate unit 20 can be positioned so that its pressing and heating surface 22a is facing upwardly and the movable pressing and heating plate unit 30 will then have a downwardly facing dough contacting surface 32a cooperating with the fixed dough contacting surface 22a. A motor or solenoid could be provided for actuating the cam assemblage 40 instead of the manual handle. All such modifications are intended to be included within the scope of the appended claims.

What is claimed and desired to be secured by Letters Patent is:

1. Apparatus for pressing and baking a flat disc of dough comprising:
   a pair of plate-like side frames;
   a bottom frame rigidly connecting said side frames in horizontally spaced, vertical relationship;
   an upper pressing and heating plate having a lower dough engaging surface and an upper heat receiving surface;
   a first support box having two opposed parallel sidewalls rigidly secured to said upper heat receiving surface; a plurality of manually operable bolts respectively traversing said side frames and respectively engagable with said opposed side walls of said first support box to rigidly secure said first support box between said side frames with said dough engaging surface of said upper heating plate disposed at a selected angle to the horizontal;
   first electrical heating means disposed within said support box for heating said dough engaging surface of said upper pressing and heating plate;
   a lower pressing and heating plate having an upper dough engaging surface and a lower heat receiving surface;
   a second support box having two opposed parallel side walls rigidly secured to said lower heat receiving surface of said lower pressing and heating plate;
   second electrical heating means disposed within said second support box for heating said dough engaging surface of said lower pressing and heating plate;
   means for pivotally mounting said second support box between said side frames on a horizontal axis positioned to mount said lower pressing and heating plate for pivotal movement in a vertical plane between a first position remote from said upper pressing and heating plate, and a second position parallel to said dough engaging surface of said upper pressing and heating plate and spaced a selected distance therefrom corresponding to the desired thickness of the disc of dough to be pressed between said upper and lower pressing and heating plates;
   said last mentioned means including a pair of manually operable bolts traversing said side frames and coaxial with said horizontal axis; and
   cam means abutting said second box support for shifting said lower pressing and heating plate between said first and second positions relative to said upper pressing and heating plate, whereby both said pressing and heating plates may be removed without tools from said side frames for cleaning or repair purposes.

2. Apparatus for pressing and baking a flat disc of dough comprising:
   a pair of plate-like side frames;
   a bottom frame rigidly connecting said side frames in horizontally spaced, vertical relationship;
   an upper pressing and heating plate having a lower dough engaging surface and an upper heat receiving surface;
   a first support box having two opposed parallel side walls rigidly secured to said upper heat receiving surface;
   a plurality of manually operable bolts traversing said side frames and respectively threadably engagable with said opposed side walls of said first support box to rigidly secure said support box between said side frames with said dough engaging surface of said upper pressing and heating plate disposed at a selected angle to the horizontal;
   first electrical heating means disposed within said first support box for heating said dough engaging surface of said upper pressing and heating plate;
   a lower pressing and heating plate having an upper dough engaging surface and a lower heat receiving surface;
   a second support box having opposed, parallel side walls rigidly secured to said lower heat receiving surface of said lower pressing and heating plate;
   second electrical heating means disposed within said second support box for heating said dough engaging surface of said lower pressing plate;
   means for pivotally mounting said second support box between said side frames on a horizontal axis positioned to mount said lower pressing and heating plate for pivotal movement in a vertical plane between a first position remote from said upper pressing and heating plate, and a second position parallel to said lower dough engaging surface of said upper pressing and heating surface and spaced a selected distance therefrom corresponding to the desired thickness of the disc of dough to be pressed between said upper and lower pressing and heating plates;
   said pivotally mounting means including a first pair of manually operable bolts traversing said side plates and operably engagable with said support box in co-axial relation to the axis of pivotal movement of said lower pressing and heating plate;
   cam means for shifting said lower pressing and heating plate between said first and second positions relative to said upper pressing and heating plate, said cam means including a horizontal axis pivot shaft; and a second pair of manually operable bolts respectively traversing said side frames in axial alignment and respectively engaging the ends of said horizontal axis pivot shaft, whereby both said pressing and heating plates and said cam means may be manually removed from said side frames for cleaning or repair purposes.

3. The apparatus of claim 1 wherein said second support box has two opposed side walls parallel to said side plates, a shaft rotationally mounted between said opposed side walls; and said shaft having internal threads at each end respectively engaged by said second pair of manually operable bolts.

4. The apparatus of claim 1, 2 or 3 wherein said manually operable bolts comprise a threaded shank portion and a head portion radially enlarged to be readily grasped by hand.

5. The apparatus of claim 1, 2, or 3 further comprising an electrical control box shaped to fit snugly between said side frames; and another pair of manually operable bolts respectively traversing said side frames and operatively engaging said electrical control box.

6. Apparatus for pressing and baking a flat disc of dough comprising:

a pair of plate-like side frames;

a bottom frame rigidly connecting said side frames in horizontally spaced, vertical relationship;

a pair of pressing and heating plates;

first manually operable bolt means for fixedly mounting one of said plates between said side frames;

second manually operable bolt means for pivotally mounting the second of said plates between said side frames on a horizontal axis positioned to mount said lower pressing and heating plate for pivotal movement in a vertical plane between a first position remote from said upper pressing and heating plate, and a second position parallel to said dough engaging surface of said upper pressing and heating plate and spaced a selected distance therefrom corresponding to the desired thickness of the disc of dough to be pressed between said upper and lower pressing and heating plates;

said one plate being disposed at a sufficient angle to the horizontal to insure the gravitational discharge of a baked disc of dough when said second plate is disposed in said first position; and means abutting said second pressing and heating plate for shifting said second pressing and heating plate between said first and second positions relative to said first pressing and heating plate, whereby both said pressing and heating plates may be removed without tools from said side frames for cleaning or repair purposes.

7. The apparatus of claim 6 wherein said manually operable bolt means comprises a threaded shank portion and a head portion radially enlarged to be readily grasped and tightened or released by hand.

8. The apparatus of claim 6 wherein said second pressing and heating plate is pivotally mounted on a horizontal shaft; and said horizontal shaft having threaded bores in each end to respectively receive said second manually operable bolt means.

9. The apparatus of claim 6 further comprising an electrical control box shaped to fit snugly between said side frames; and third manually operable bolt means traversing said side frames and operatively engaging said electrical control box to removably secure said electrical control box between said side frames.

10. The apparatus of claim 6 wherein said side frames and said bottom frame are integrally formed by stamping operations on a metal sheet.

11. The apparatus of claim 10 wherein an upstanding flange is integrally formed on one transverse edge of said bottom frame, and further comprising an electrical control box shaped to fit snugly between said side frames and in abutting relation to said upstanding flange; and third manually operable bolt means traversing said side frames and threadably engaging said electrical control box.

* * * * *